(12) United States Patent
Landholm et al.

(10) Patent No.: US 8,905,465 B2
(45) Date of Patent: Dec. 9, 2014

(54) HINGE AND SUPPORT MEMBER ARRANGEMENT

(71) Applicant: Volvo Car Corporation, Goeteborg (SE)

(72) Inventors: Robert Landholm, Ljungskile (SE); Peter Lindmark, Moelndal (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 13/871,515

(22) Filed: Apr. 26, 2013

(65) Prior Publication Data
US 2013/0285415 A1    Oct. 31, 2013

(30) Foreign Application Priority Data

Apr. 26, 2012   (EP) ..................................... 12165693

(51) Int. Cl.
*B62D 25/12* (2006.01)
*B62D 25/16* (2006.01)

(52) U.S. Cl.
CPC .............. *B62D 25/12* (2013.01); *B62D 25/163* (2013.01)
USPC ......................... 296/193.11; 296/198; 296/76

(58) Field of Classification Search
CPC ...... B62D 25/10; B62D 25/105; B62D 25/12; E05D 5/0207; E05D 5/043; E05D 5/062; E05D 7/12; E05D 7/121
USPC ............ 296/76, 193.09, 193.11, 198, 203.02; 49/399; 248/213.1
See application file for complete search history.

(56) References Cited

U.S. PATENT DOCUMENTS

| | | | |
|---|---|---|---|
| 3,017,944 A * | 1/1962 | Norrie ......................... | 180/69.21 |
| 5,271,658 A | 12/1993 | Haldenwanger et al. | |
| 6,237,990 B1 * | 5/2001 | Barbier et al. ........... | 296/187.09 |
| 7,828,374 B2 * | 11/2010 | Rinderlin et al. ............. | 296/198 |
| 2004/0108753 A1 | 6/2004 | Bruderick et al. | |
| 2005/0046237 A1 * | 3/2005 | Miyoshi et al. .......... | 296/203.02 |

(Continued)

FOREIGN PATENT DOCUMENTS

| | | |
|---|---|---|
| DE | 4010453 A1 | 10/1991 |
| DE | 202008007671 U1 | 9/2008 |

(Continued)

OTHER PUBLICATIONS

English translation of EP 1,806,274; retreived via Patenttranslate from the EPO website "Espacenet" on Mar. 20, 2014.*

(Continued)

*Primary Examiner* — Glenn Dayoan
*Assistant Examiner* — Jason S Daniels
(74) *Attorney, Agent, or Firm* — Brooks Kushman P.C.

(57) ABSTRACT

The present disclosure relates to a hinge and support member arrangement for providing a hinged connection between a bonnet and a body structure of a vehicle. The hinge and support member arrangement comprises a hinge mechanism providing a hinged connection for opening and closing of the bonnet, and a support member adapted to be attached to the body structure of the vehicle and further adapted to carry a fender. In addition, the hinge mechanism is adapted to be connected to the body structure via the support member. The disclosure further relates to a support member for use in such a hinge and support member arrangement and a vehicle comprising such a hinge and support member arrangement.

14 Claims, 4 Drawing Sheets

(56) References Cited

U.S. PATENT DOCUMENTS

| | | | |
|---|---|---|---|
| 2008/0296934 A1* | 12/2008 | Shishido | 296/203.02 |
| 2009/0194348 A1* | 8/2009 | Faubert et al. | 180/69.21 |
| 2010/0270829 A1* | 10/2010 | Furumoto | 296/193.11 |

FOREIGN PATENT DOCUMENTS

| | | | |
|---|---|---|---|
| DE | 102009058127 A1 | | 6/2011 |
| EP | 1669278 A1 | | 6/2006 |
| EP | 1806274 A1 | | 7/2007 |
| GB | 2452252 A | * | 3/2009 |
| JP | 2008184119 A | * | 8/2008 |
| WO | 2008013841 A2 | | 1/2008 |

OTHER PUBLICATIONS

Extended European Search Report Dated Jul. 31, 2012, Application No. 12165693.8-1268, Applicant Volvo Car Corporation, 8 Pages.

* cited by examiner

HINGE AND SUPPORT MEMBER ARRANGEMENT

CROSS-REFERENCE TO RELATED APPLICATIONS

This application claims foreign priority benefits under 35 U.S.C. §119(a)-(d) to European patent application number EP 12165693.8, filed Apr. 26, 2012, which is incorporated by reference in its entirety.

TECHNICAL FIELD

The present disclosure relates to a hinge and support member arrangement. The disclosure further relates to a support member adapted for use in such a hinge and support member arrangement and a vehicle comprising such a hinge and support member arrangement.

BACKGROUND

In a vehicle, such as a car, there are normally provided hinges between a bonnet and a body structure of the vehicle in order to be able to open the bonnet to get access to the engine compartment. It is further known to use deployable bonnets, i.e., bonnets which are adapted to take a deployed position in case of a collision with a pedestrian in order to mitigate the consequences of such a collision. The hinges are usually made of metal, since they should be able to carry the load of the bonnet as well as take up possible forces in case of a collision. The body structure of the vehicle provides mechanical stability of the vehicle, which e.g., is important in case of a collision. The hinges and front fenders of the vehicle are attached to beams of the front part of the body structure of the vehicle. For a conventional vehicle model, not only the fenders but also the body structure is specifically adapted for that particular vehicle model. As a consequence, a vehicle model differing from another vehicle model as regards the shape of the fenders, also differs from that other vehicle model as regards the shape of the body structure, since the shape of the body structure is adapted to, among others, the shape of the fenders and the location of the hinges.

SUMMARY

An object of the present disclosure is to overcome or ameliorate at least one of the disadvantages of the prior art, or to provide a useful alternative.

It is desirable to provide a hinge and support member arrangement giving a larger freedom when selecting the shape and/or location of the hinges for the hinged connection with the bonnet.

It is further desirable to provide a hinge and support member arrangement allowing different vehicle models to use a common body structure.

Thus, in a first aspect of the present disclosure there is provided a hinge and support member arrangement for providing a hinged connection between a bonnet and a body structure of a vehicle. The hinge and support member arrangement comprises a hinge mechanism providing a hinged connection for opening and closing of the bonnet, and a support member adapted to be attached to the body structure of the vehicle, the support member further being adapted to carry a fender, wherein the hinge mechanism is adapted to be connected to the body structure via the support member.

A main portion of the support member may be made of a material having less weight than metal, e.g., a polymer, in particular a thermo-moulded polymer, thus reducing the total weight of the vehicle.

The hinge mechanism is not directly connected to the body structure, as is common in prior art technology. Instead the support member is located in between the hinge mechanism and the body structure.

The support member may be given any desired geometry, thereby combining the requirements on the body structure for collision safety and the desired geometry of the fenders of the vehicle. By adapting the shape of the support member to the desired geometry of the fender, which is going to be supported by that support member, a common shape of the body structure may be used for different vehicle models, at least as regards the front portion of the body structure. Since the support member may substantially be made of an easily formed material, such as a polymer, preferably a thermo-moulded polymer, it is relatively easy and cheap to change the shape of it, as compared to instead adapting the shape of the front portion of the body structure, which is normally made of metal.

By using the hinge and support member arrangement according to the disclosure, the hinge mechanism itself may be directed to providing the hinge function. Other functions, such as overcoming spatial differences between different components at assembly of the vehicle may be dispensed with, since this function is performed by the support member. It is thus possible to use a hinge mechanism of less weight and/or volume than conventional ones, thereby saving money and reducing weight.

Further, with a hinge and support member arrangement according to the disclosure, it is possible to make the hinge mechanism and the body structure of two different metals, such as steel and aluminum, since the support member will be located in between preventing direct contact, and hence preventing corrosion, between the two different metals.

The hinge mechanism may comprise a bracket member and an elongated member being pivotally connected to each other, thereby providing the hinged connection for allowing opening and closing of the bonnet. The bracket member is attachable to the support member. The elongated member is attachable to the bonnet, possibly via an optional additional hinge member. An additional hinge member is for example appropriate if the hinge mechanism is used for a deployable bonnet. In a hinge mechanism used in a hinge and support member arrangement according to the disclosure, wherein the function of the hinge mechanism itself may be directed to providing the hinge function as explained above, the bracket member may be rather small as compared to prior art hinge mechanisms, e.g., an L-shaped bracket.

In a preferred embodiment, the hinge mechanism is adapted to be attached directly to the support member, i.e., without any intermediate members. This reduces the number of parts in the vehicle and hence the cost. It also makes assembly of the vehicle easier.

The support member may substantially be made of a polymer, such as a thermo-moulded polymer, e.g., a main portion of the support member may be of the polymer, preferably at least 70 weight % and most preferably at least 90 weight %. The support member may additionally comprise a reinforcement member, e.g., made of metal.

The main part of the support member may be made in one piece, which makes thermo-moulding an appropriate manufacturing method.

The hinge and support member arrangement may be arranged such that, a first attachment site, at which the support member is attached to the body structure, is laterally and/or vertically displaced in relation to a second attachment site, at which the hinge mechanism is attached to the support member, when mounted in the vehicle. If there is more than one first attachment site, the first attachment site used for determining the vertical and lateral displacement is the one being closest to the hinge mechanism. In a similar way, if there is more than one second attachment site, the second attachment site used for determining the vertical and lateral displacement is the second attachment site being closest to the body structure. The lateral displacement may be between 0 and 100 mm, preferably between 0 and 80 mm, most preferably between 0 and 70 mm. The vertical displacement may be between 0 and 100 mm, preferably between 10 and 80 mm, most preferably between 20 and 70 mm. Thereby the support member acts as a bridging component between the hinge mechanism and the body structure. This makes it possible to use a common model of body structure for different vehicle models, by adapting the shape of the support member for each vehicle model. The body structure may hence be adapted to provide collision safety. Thereby both safety requirements and front fender requirements may be met.

The support member is adapted to the fenders of each vehicle model. The support member may further be used to support other vehicle components, such as a head-lamp unit and/or various sensors of the vehicle.

In an embodiment, the support member may comprises a reinforcement member, arranged to take up a force at least in a longitudinal direction being applied to the support member at the second attachment site, when mounted in the vehicle. Such a force may for example arise in case of a frontal collision.

The reinforcement member may be a metal plate, preferably located within the support member. It may be moulded into the support member during manufacturing.

Alternatively, the reinforcement member may be a wire extending at least from a first position at, or adjacent to, the second attachment site to a second position being longitudinally forward of the first position, when mounted in the vehicle. The second position is located at the body structure, e.g., at the first attachment site, wherein the support member is attached to the body structure. Thereby the same attachment member may be used for attaching both the support member and the wire to the body structure. The wire is thus adapted for transferring loads from the hinge mechanism to the body structure. A wire offers a light-weight solution for taking up loads along the direction of the wire. The wire is suitably arranged in the longitudinal direction of the vehicle, preferably within the support member.

The hinge mechanism may comprise a bracket member and an elongated member being pivotally connected to each other by means of a pivot axis providing the hinged connection for allowing opening and closing of the bonnet, the bracket member being attachable to the support member and the elongated member being attachable to the bonnet, optionally via an additional hinge member.

The hinge mechanism may further comprise a catch member adapted to abut against the bracket member of the hinge mechanism in case the hinge mechanism is exerted to a force in at least a longitudinal direction in relation to the support member, the catch member at abutment transferring at least part of the force from the elongated member to the bracket member. Thereby, not all the force is transferred via the pivotal connection. Such a force may for example arise in case of a frontal collision.

Further, in an embodiment of the invention, the bracket member may be dispensed with. The hinge mechanism then comprises an elongated member being pivotally connectable to the support member. The elongated member is attachable to the bonnet, optionally via an additional hinge member. The pivot axis of the hinge mechanism, i.e., the pivotal connection between the elongated member and the support member, then passes directly through the support member. The pivot axis provides the hinged connection for allowing opening and closing of the bonnet. This solution saves material, and thus also reduces weight and cost as compared to using a hinge mechanism including a bracket member. Further, assembly of the vehicle is simplified.

The hinge mechanism may further comprise a hook adapted to abut against the body structure of the vehicle in case the hinge mechanism is exerted to a force in at least a longitudinal direction in relation to the hinge and support member arrangement, the hook at abutment transferring at least part of the force from the hinge mechanism to the body structure.

In a second aspect of the present invention there is provided a support member for use in a hinge and support member arrangement as described above, wherein the support member is adapted for connection of a hinge mechanism. In particular, the support member is adapted to be located in between the body structure of the vehicle and the hinge mechanism. The support member is further adapted to carry a fender. The support member may also be used to support other vehicle components, such as a head-lamp unit and/or various sensors of the vehicle. The support member may be manufactured and sold separately from the rest of the hinge and support member arrangement.

In a third aspect of the present disclosure there is provided a hinge mechanism for use in a hinge and support member arrangement as described above, wherein the hinge mechanism is adapted to be connected to a support member. The hinge mechanism may be manufactured and sold separately from the rest of the hinge and support member arrangement.

In a fourth aspect of the present disclosure, there is provided a vehicle comprising a hinge and support member arrangement according to above, the hinge and support member arrangement being attached to the body structure of the vehicle.

BRIEF DESCRIPTION OF THE DRAWINGS

The present disclosure will hereinafter be further explained by means of non-limiting examples with reference to the appended drawings, wherein.

It should be noted that the appended drawings are not necessarily drawn to scale and that the dimensions of some features of the present disclosure may have been exaggerated for the sake of clarity.

DETAILED DESCRIPTION

The disclosure will, in the following, be exemplified by embodiments. It should however be realized that the embodiments are included in order to explain principles of the invention and not to limit the scope of the invention, defined by the appended claims. Details from two or more of the embodiments may be combined with each other.

Figure 1:
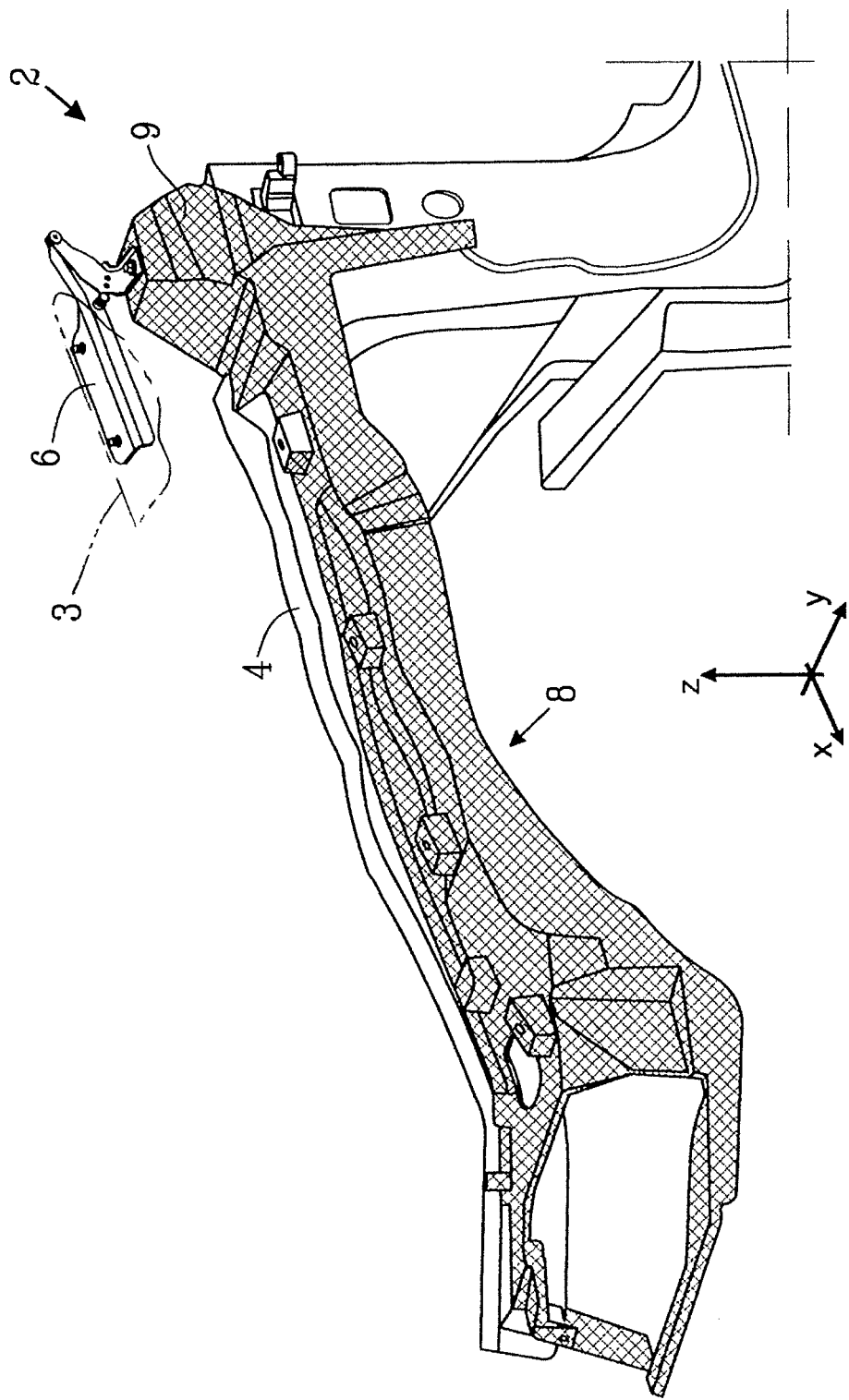
FIG. 1 is a schematic view of a hinge and support member arrangement according to a first embodiment of the disclosure.

FIG. 1 schematically illustrates a hinge and support member arrangement 2 according to a first embodiment of the disclosure. The hinge and support member arrangement 2 provides a hinged connection between a bonnet 3 (shown schematically in phantom lines and broken away in FIG. 1) and a body structure 4 of a vehicle, such that it is possible to get access to the engine compartment. The hinge and support member arrangement 2 comprises a hinge mechanism 6 providing the hinged connection for opening and closing of the bonnet, and a support member 8, which is attached to the body structure 4, more specifically to a front beam member of the body structure 4. The support member 8 is further adapted to carry a fender and a head-lamp unit. The hinge mechanism 6 is connected to the body structure 4 via the support member 8. The support member 8 comprises a protrusion 9 at its rear end. The shape of the protrusion 9 has been selected to provide a desired attachment location for the hinge mechanism 6. The hinge mechanism 6 is thus not directly connected to the body structure 4, as in a conventional vehicle. Instead, the support member 8 is located in between the hinge mechanism 6 and the body structure 4.

A suitable material for the main part of the support member 8 is a polymer, e.g., a thermo-moulded polymer. Using a polymer results in less weight as compared to a corresponding component made of metal. The main part of the support member 8 may be made in one piece as illustrated in FIG. 1. The support member 8 may be reinforced by a metal piece and/or a wire, as further described below in conjunction with FIG. 6. The hinge mechanism 6 is suitably made of metal, as illustrated in FIG. 1.

Figure 2:
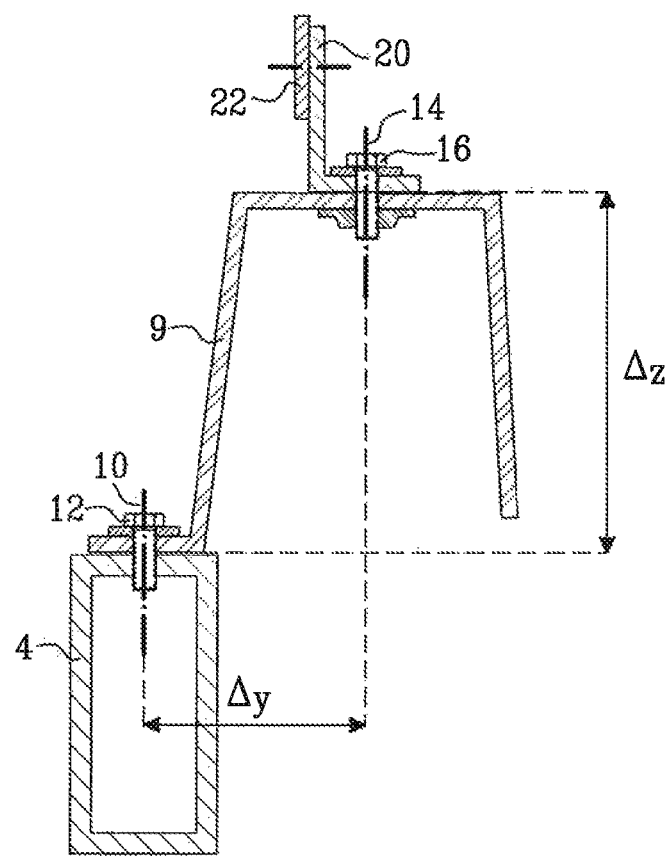
FIG. 2 is a cross-section of FIG. 1.

FIG. 2 illustrates a cross-section through the protrusion 9 at the rear end of the support member 8 of FIG. 1. The support member 8 is attached to the body structure 4 at a first attachment site 10 by a first attachment member 12, e.g., a screw or a nut and bolt connection. The hinge mechanism 6 is attached to the support member 8 at a second attachment site 14 by a second attachment member 16, e.g., another screw or a nut and bolt connection. As can be seen in the cross-sectional view of FIG. 2, the support member 8 provides a lateral displacement $\Delta y$ between the first attachment site 10 and the second attachment site 14. In the same way the support member 8 provides a vertical displacement $\Delta z$ between the first attachment site 10 and the second attachment site 14. The directions lateral and vertical are referring to when the hinge and support member arrangement 2 is mounted in a vehicle, which stands on a flat ground. See the coordinate system shown in FIG. 1, wherein the x-axis is in the longitudinal direction of the vehicle, the y-axis in the lateral direction of the vehicle and the z-axis in the height direction of the vehicle. The first attachment site 10 and the second attachment site 12 may be at different longitudinal positions in the vehicle, i.e., along the x-axis. If more than one first attachment member 12 is used, the first attachment site 10 used for determining the vertical and lateral displacement is at the first attachment member 12 being closest to the hinge mechanism 6. In a similar way, the second attachment site 14 used for determining the vertical and lateral displacement is at the second attachment member 16 being closest to the body structure 4.

The support member 8 may be given any desired geometry, thereby combining the requirements on the body structure for collision safety and the desired geometry of the fenders of the vehicle. By adapting the shape of the support member 8 to the desired geometry of the fender being carried by the support member 8 and to the desired location of the hinge mechanism 6, a common shape of the body structure may be used for different vehicle models, at least as regards the front portion of the body structure. Since the support member 8 is substantially made of a polymer, for example a thermo-moulded polymer, it is relatively easy and cheap to change the shape of it between different vehicle models, as compared to instead changing the shape of the body structure, which is normally made of metal.

The support member 8 comprises a plurality of first attachment sites attaching the support member 8 to the body structure 4 along its longitudinal length, i.e., along the x-axis of FIG. 1.

Figure 3:
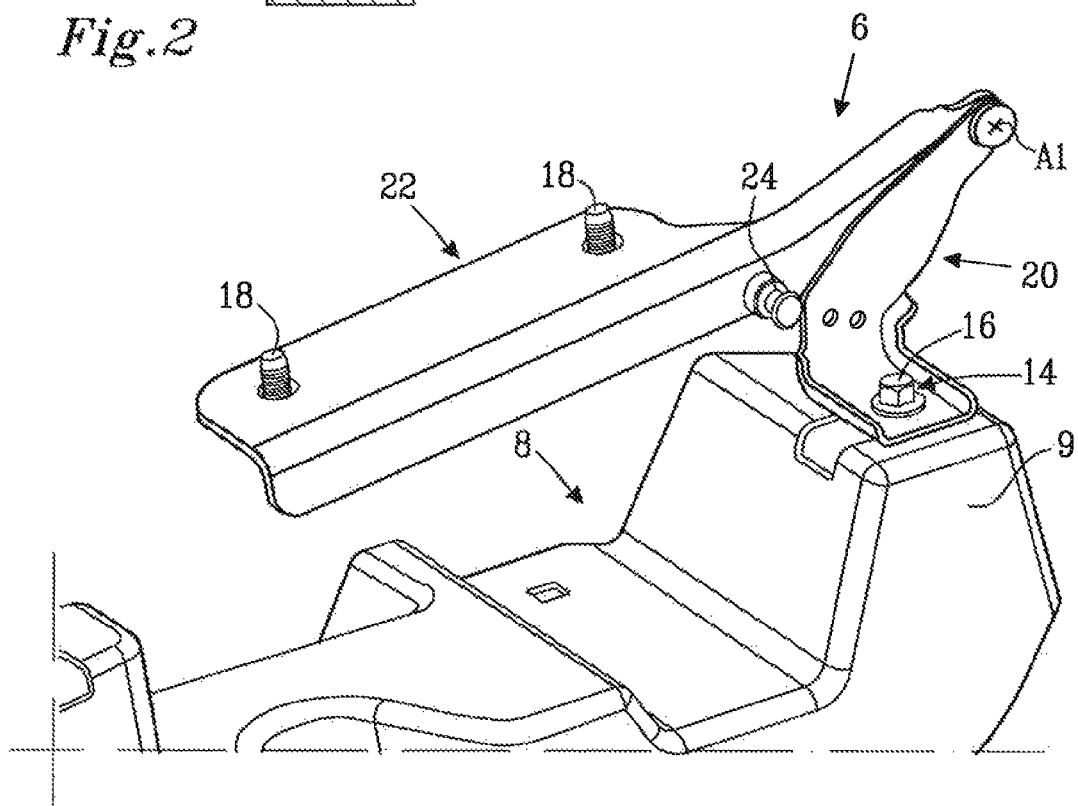
FIG. 3 illustrates the hinge mechanism of FIG. 1 in greater detail.

FIG. 3 more detailedly illustrates the hinge mechanism 6 of FIG. 1. A bracket member 20 of the hinge mechanism 6 is attached to the support member 8 at the second attachment site 14 by the second attachment member 16. An elongated member 22 of the hinge mechanism 6 is adapted for attachment to the bonnet (not illustrated) by means of third attachment members 18. The bracket member 20 and the elongated member 22 are pivotally connected to each other at axis A1 providing the hinged connection for allowing opening and closing of the bonnet. The hinge mechanism 6 further comprises a catch member 24 adapted to abut against the bracket member 20 of the hinge mechanism 6 in case the hinge mechanism 6 is exerted to a force being at least partly in the longitudinal direction of the vehicle, e.g., in case of a frontal collision. The catch member 24 will then transfer at least part of the force in the longitudinal direction of the vehicle from the elongated member 22 to the bracket member 20 and further via the support member 8 to the body structure 4. The catch member 24 is optional and the hinge mechanism 6 would function also without a catch member 24.

Figure 4:
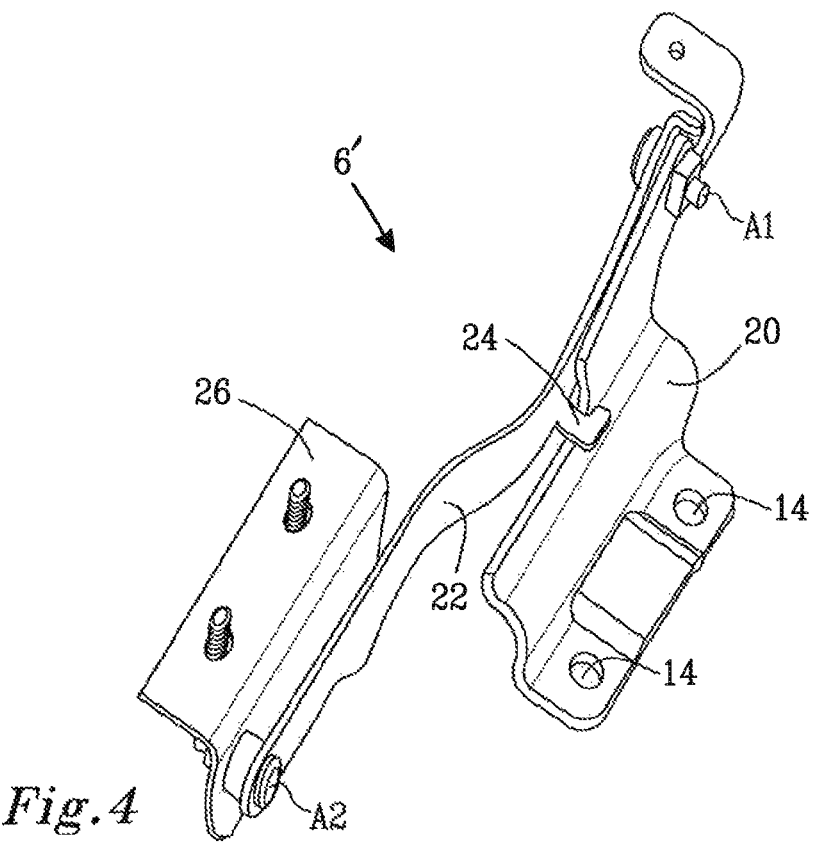
FIG. 4 illustrates an alternative hinge mechanism.

FIG. 4 illustrates an alternative hinge mechanism 6', which is suitable for a deployable bonnet. The hinge mechanism 6' comprises a bracket member 20 being pivotally connected to an elongated member 22 at axis A1. The bonnet (not shown) is attachable to an additional hinge member 26 of the hinge mechanism 6'. The additional hinge member 26 is pivotally connected at axis A2 to the elongated member 22. The operation of a deployable bonnet is known to the skilled person and will not be further described in this application. The hinge mechanism 6' comprises a catch member 24 in the form of a hook gripping around the bracket member 20. The catch member 24 is able to transfer at least part of the force partly in the longitudinal direction of the vehicle in case of a collision. The catch member 24 is optional and the hinge mechanism 6' would function also without a catch member 24.

The hinge and support member arrangement 2 of the disclosure works both for conventional bonnets, as in FIG. 3, and for deployable bonnets, as in FIG. 4.

Figure 5:
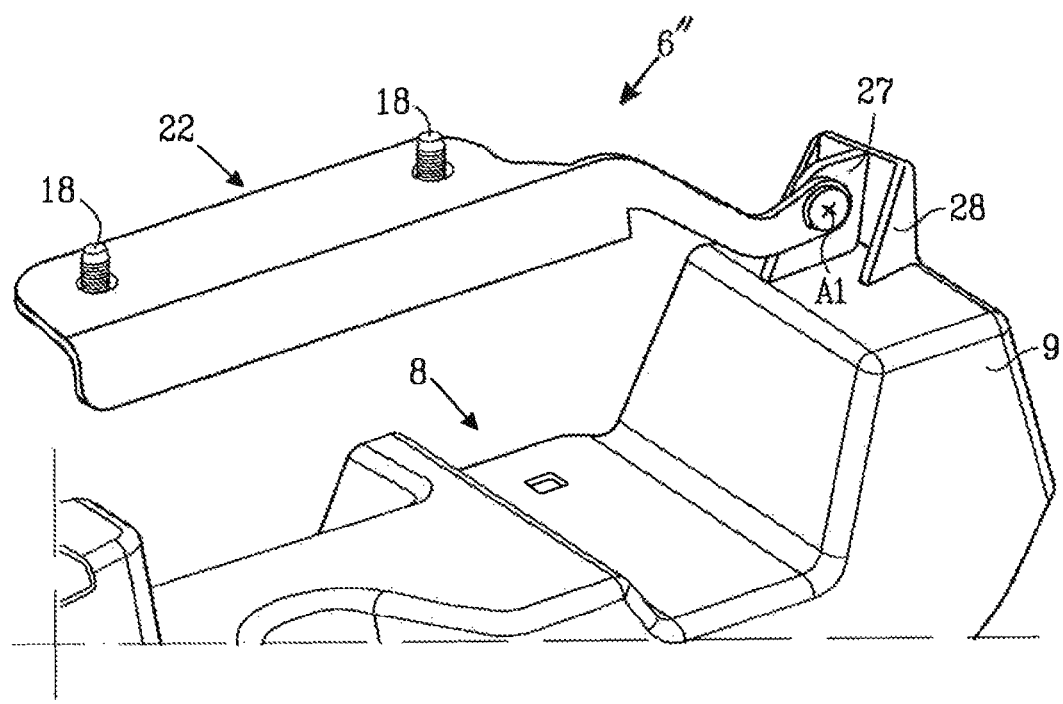
FIG. 5 illustrates an alternative connection of a hinge mechanism.

FIG. 5 illustrates an alternative connection of the hinge mechanism. The hinge mechanism 6" comprises an elongated member 22 being pivotally connected to the support member 8 itself at pivot axis A1, thereby omitting the bracket member 20 of the embodiments of FIGS. 3 and 4. The protrusion 9 of the support member 8 is provided with an extra protrusion, here in the form of a fin 27 and a fin reinforcement member 28, giving the pivot axis A1 a location allowing pivoting of the elongated member 22 around the pivot axis A1 between the open and closed position of the bonnet. This alternative connection of the hinge mechanism would function both for conventional bonnets and for deployable bonnets.

Figure 6:
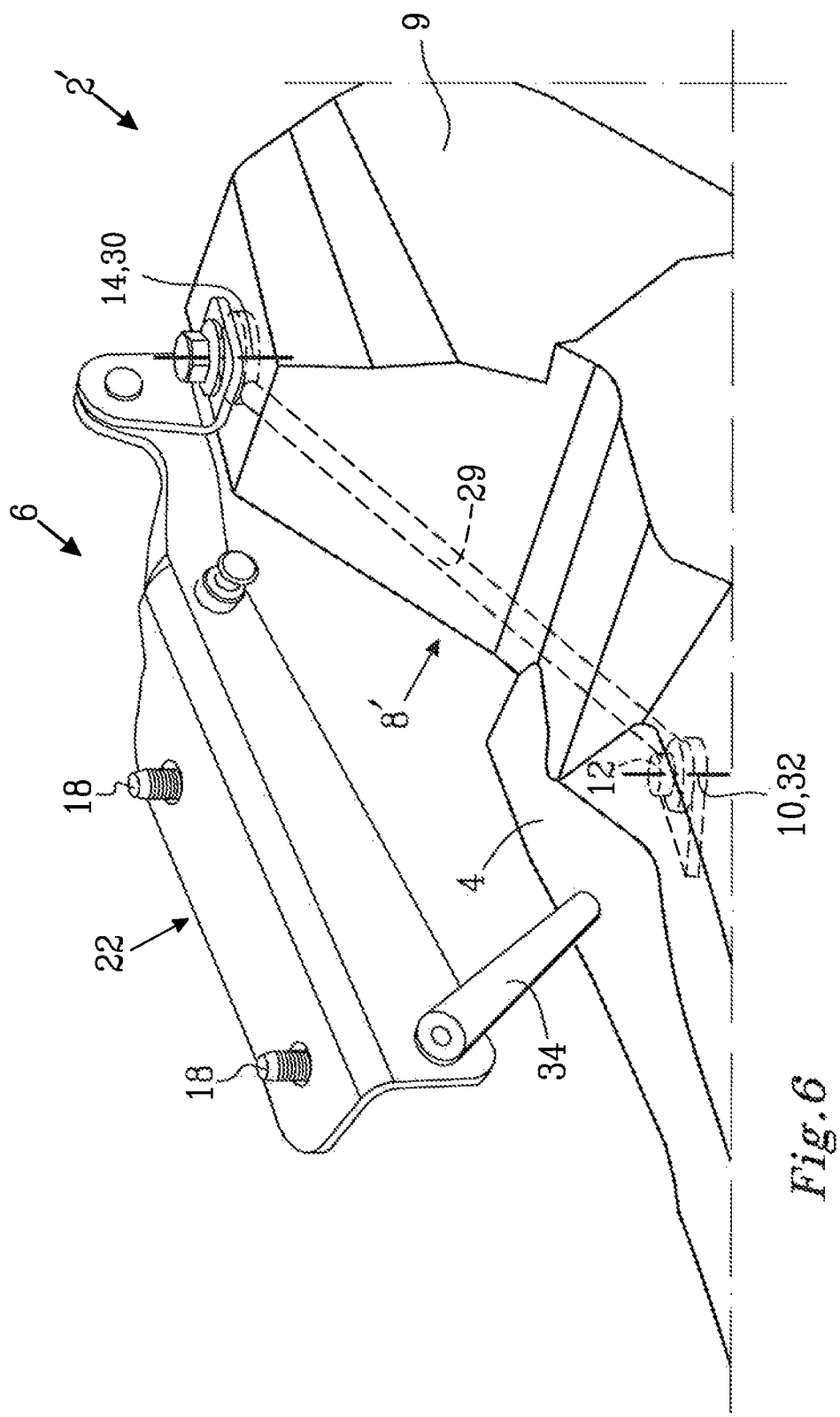
FIG. 6 is a schematic view of a hinge and support member arrangement according to a second embodiment of the disclosure.

FIG. 6 schematically illustrates a hinge and support member arrangement 2' according to a second embodiment of the disclosure, wherein the hinge mechanism 6 comprises a reinforcement. The support member 8' comprises a wire 29, preferably made of metal, acting as a reinforcement member extending at least from a first position 30 at, or adjacent to, the second attachment site 14 to a second position 32 being longitudinally forward of the first position 30, when mounted in the vehicle. The second position 32 is located at the body structure 4. The wire 29 is arranged to take up a force at least in a longitudinal direction being applied to the support member 8' at the second attachment site 14 of the hinge mechanism 6 and transfer it to the body structure 4. The wire 29 is suitably attached at a first attachment site 10, wherein the support member 8' is attached to the body structure 4. Thereby the first attachment member 12 may be used for attaching both the support member 8' and the wire 29.

The hinge mechanism 6 of FIG. 6 further comprises a hook 34 adapted to abut against the body structure 4 in case the hinge mechanism 6 is exerted to a force in at least a longitudinal direction in relation to the hinge and support member arrangement, e.g., in case of a collision, the hook 34 at abutment transferring at least part of the force from the hinge mechanism 6 directly to the body structure 4.

The hinge mechanism 6 may comprise both a wire 29 and a hook 34 as in FIG. 6, or only one of them.

Further modifications of the disclosure within the scope of the appended claims are feasible. As such, the present invention should not be considered as limited by the embodiments and figures described herein. Rather, the full scope of the disclosure should be determined by the appended claims, with reference to the description and drawings.

What is claimed is:

1. A hinge and support member arrangement for providing a hinged connection between a bonnet and a body structure of a vehicle, the hinge and support member arrangement comprising:
   a hinge mechanism for providing the hinged connection for opening and closing of the bonnet; and
   a support member adapted to be attached to the body structure of the vehicle such that the support member extends longitudinally along a side of the body structure, the support member further being adapted to carry a fender, wherein the hinge mechanism is attachable directly to the support member such that the hinge mechanism is connectable to the body structure via the support member;
   wherein the support member is adapted to be attached to the body structure at a first attachment site, and the hinge mechanism is attachable to the support member at a second attachment site that is laterally and/or vertically displaced in relation to the first attachment site, wherein the support member further comprises a reinforcement member configured to take up a force at least in a longitudinal direction applied to the support member at the second attachment site when the support member is mounted in the vehicle, the reinforcement member comprising a wire arranged to extend at least from a first position at, or adjacent to, the second attachment site to a second position located at the body structure and being longitudinally forward of the first position when the support member is mounted in the vehicle, wherein the support member includes a portion made of a polymer, the portion having a first opening at the first attachment site for receiving a first attachment member, and a second opening at the second attachment site for receiving a second attachment member, and wherein the wire is disposed within the portion, the wire having one end aligned with the first opening, and another end aligned with the second opening.

2. The hinge and support member arrangement according to claim 1 wherein the polymer is a thermo-moulded polymer.

3. The hinge and support member arrangement according to claim 1 wherein a main part of the support member is made in one piece.

4. The hinge and support member arrangement according to claim 1 wherein the support member further is adapted to carry a head-lamp unit and/or various sensors of the vehicle.

5. The hinge and support member arrangement according to claim 1 wherein the hinge mechanism comprises a bracket member and an elongated member being pivotally connected to each other by means of a pivot axis providing the hinged connection for allowing opening and closing of the bonnet, the bracket member being attachable to the support member and the elongated member being attachable to the bonnet.

6. The hinge and support member arrangement according to claim 5 wherein the elongated member is attachable to the bonnet via an additional hinge member.

7. The hinge and support member arrangement according to claim 5 wherein the elongated member further comprises a catch member adapted to abut against the bracket member of the hinge mechanism in case a force is exerted on the hinge mechanism in at least a longitudinal direction in relation to the support member, the catch member being configured to transfer at least part of the force from the elongated member to the bracket member at abutment.

8. The hinge and support member arrangement according to claim 1 wherein the hinge mechanism comprises an elongated member being pivotally connectable to the support member by means of a pivot axis going through the support member providing the hinged connection for allowing opening and closing of the bonnet, the elongated member being attachable to the bonnet.

9. The hinge and support member arrangement according to claim 8 wherein the elongated member is attachable to the bonnet via an additional hinge member.

10. The hinge and support member arrangement according to claim 1 wherein the hinge mechanism further comprises a hook adapted to abut against the body structure in case a force is exerted on the hinge mechanism in at least a longitudinal direction in relation to the hinge and support member arrangement, the hook being configured to transfer at least part of the force from the hinge mechanism to the body structure at abutment.

11. A support member for use in a hinge and support member arrangement that is usable with a vehicle having a body structure and a bonnet, the hinge and support member arrangement having a hinge mechanism for providing a hinged connection between the bonnet and the body structure, the support member being adapted for connection of the hinge mechanism to the body structure, wherein the support member is attachable to the body structure at a first attachment site and attachable to the hinge mechanism at a second attachment site, the support member comprising:
   a portion made of a polymer; and
   a metal reinforcement wire disposed within the portion, the wire extending at least from a first position at, or adjacent to, the second attachment site to a second position located at, or adjacent to, the first attachment site and being longitudinally forward of the first position when the support member is mounted in the vehicle;
   wherein the portion made of a polymer has a first opening at the first attachment site for receiving a first attachment member, and a second opening at the second attachment site for receiving a second attachment member, and wherein the wire has one end aligned with the first opening, and another end aligned with the second opening.

12. A vehicle comprising:

a body structure;

a bonnet; and a hinge and support member arrangement including a hinge mechanism connected to the bonnet and providing a hinged connection for opening and closing of the bonnet, and a support member attached to the body structure of the vehicle at a first attachment site and attached to the hinge mechanism at a second attachment site such that the hinge mechanism is connected to the body structure via the support member, wherein the hinge mechanism includes a hook adapted to abut against the body structure in case a force is exerted on the hinge mechanism in at least a longitudinal direction in relation to the hinge and support member arrangement, the hook being configured to transfer at least part of the force from the hinge mechanism to the body structure at abutment, wherein the support member includes a portion made of a polymer, and a metal reinforcement wire disposed within the portion, the wire extending at least from a first position at, or adjacent to, the second attachment site to a second position located at, or adjacent to, the first attachment site and being longitudinally forward of the first position, wherein the portion made of a polymer has a first opening at the first attachment site for receiving a first attachment member, and a second opening at the second attachment site for receiving a second attachment member, and wherein the wire has one end aligned with the first opening, and another end aligned with the second opening.

13. The vehicle according to claim 12 wherein the hinge mechanism is attached directly to the support member.

14. The vehicle according to claim 12 wherein the support member is substantially made of a polymer.

* * * * *